(12) United States Patent
DiCamillo et al.

(10) Patent No.: US 8,707,208 B2
(45) Date of Patent: Apr. 22, 2014

(54) FONT SELECTOR AND METHOD FOR THE SAME

(75) Inventors: Adrienne T. DiCamillo, Dove Canyon, CA (US); Mark R. DiCamillo, Dove Canyon, CA (US)

(73) Assignee: Confetti & Frolic, Dove Canyon, CA (US)

( * ) Notice: Subject to any disclaimer, the term of this patent is extended or adjusted under 35 U.S.C. 154(b) by 435 days.

(21) Appl. No.: 12/765,242

(22) Filed: Apr. 22, 2010

(65) Prior Publication Data

US 2010/0275161 A1 Oct. 28, 2010

Related U.S. Application Data

(60) Provisional application No. 61/214,350, filed on Apr. 22, 2009.

(51) Int. Cl.
*G06F 3/048* (2013.01)

(52) U.S. Cl.
USPC ............ 715/810; 715/210; 345/467; 345/469

(58) Field of Classification Search
CPC ..... G06F 17/211; G06F 3/018; G06T 11/203; G06T 11/60

USPC .......................... 715/810, 210; 345/467, 469
See application file for complete search history.

(56) References Cited

U.S. PATENT DOCUMENTS

| | | | | |
|---|---|---|---|---|
| 5,272,766 A | * | 12/1993 | Higgins et al. | 382/161 |
| 6,128,632 A | * | 10/2000 | McCully | 715/210 |
| 7,721,222 B1 | * | 5/2010 | Shaik | 715/773 |
| 7,768,513 B2 | * | 8/2010 | Klassen | 345/467 |
| 2006/0077494 A1 | * | 4/2006 | Kanzaki et al. | 358/537 |
| 2007/0188498 A1 | * | 8/2007 | Okada et al. | 345/469 |
| 2010/0245364 A1 | * | 9/2010 | Klassen | 345/467 |

* cited by examiner

*Primary Examiner* — Amy Ng
*Assistant Examiner* — Andres E Gutierrez
(74) *Attorney, Agent, or Firm* — Barnes & Thornburg LLP; Thomas W. McWilliams; Edward F. Behm, Jr.

(57) ABSTRACT

A multi-glyph character selector is disclosed. The selector includes at least two glyphs associated with a character, wherein a microprocessor driven activation of the character selects a first of the at least two glyphs, and a subsequent activation of the character selects a second of the at least two glyphs, and a display driver, wherein the first glyph provides a first characterization of the character on a display in accordance with the display driver, and the second glyph provides a second characterization of the character on the display.

11 Claims, 13 Drawing Sheets

Believe

Figure 1

*Believe*

*You inspire me to greater things*

Figure 5 technology featuring in-place, keystroke selection of fonts directly on the computer screen

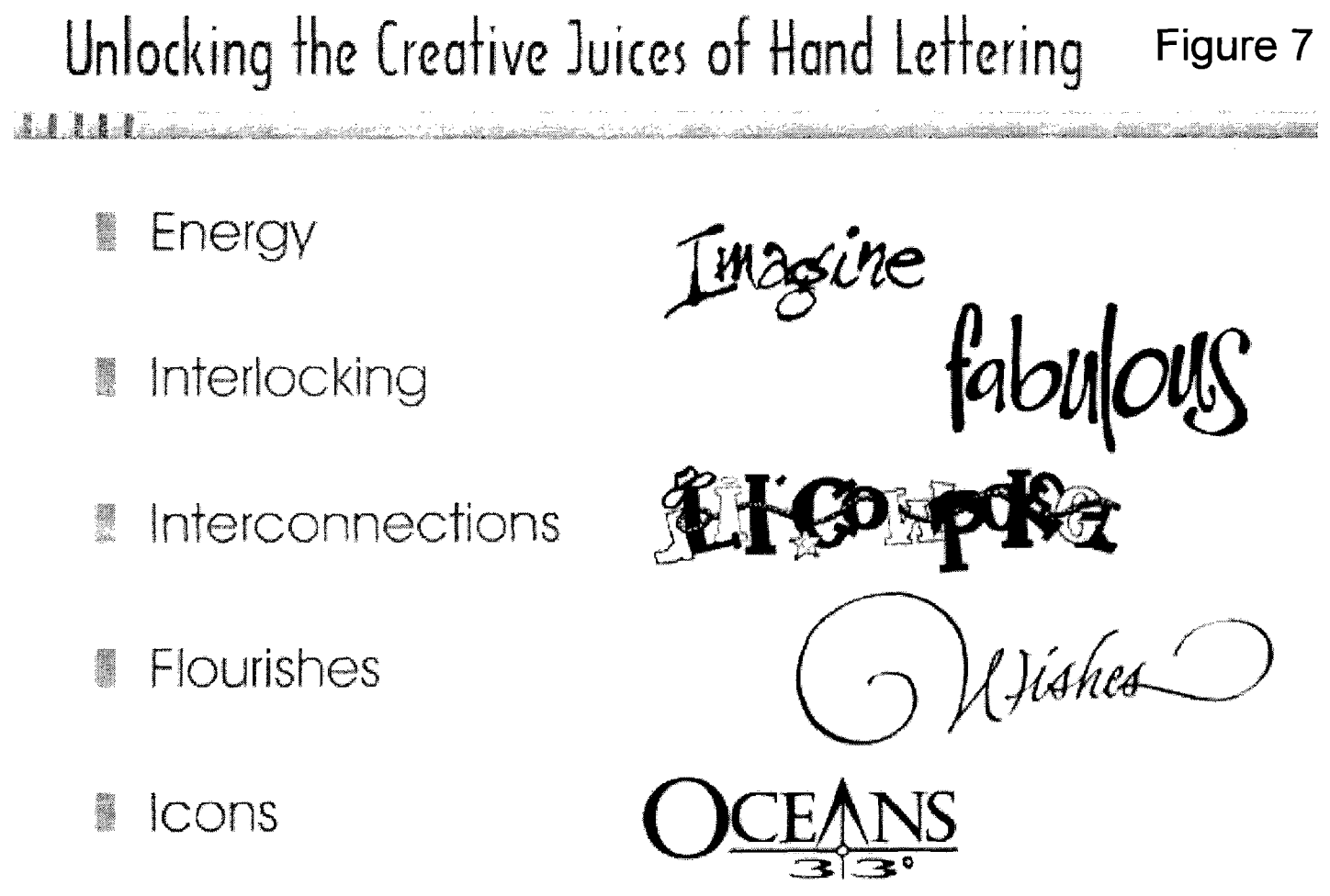

Unlocking the Creative Juices of Hand Lettering Figure 7

- Energy
- Interlocking
- Interconnections
- Flourishes
- Icons

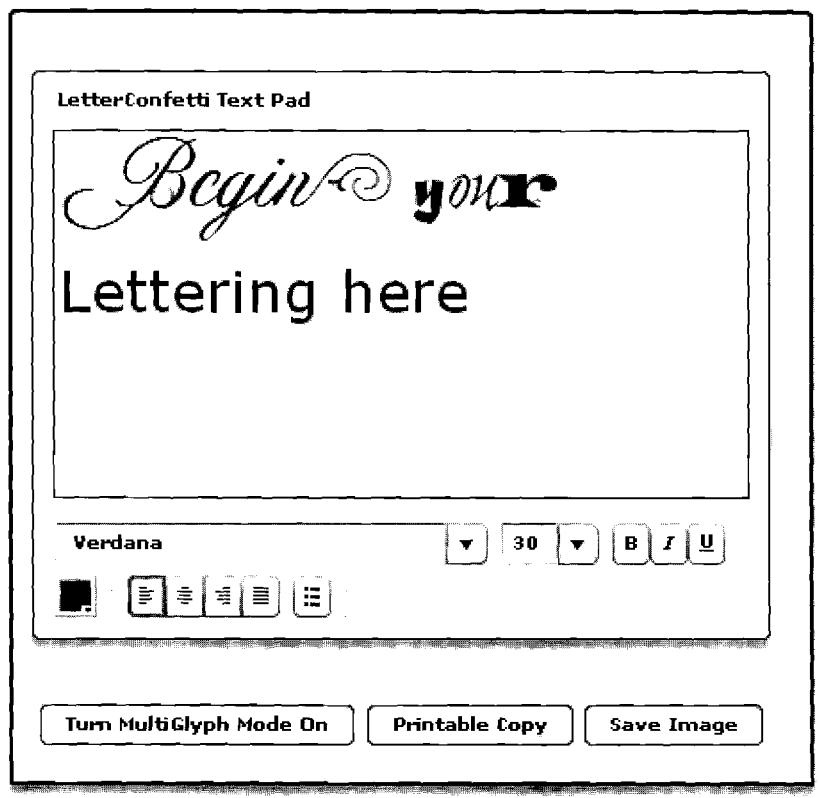
FIG. 9
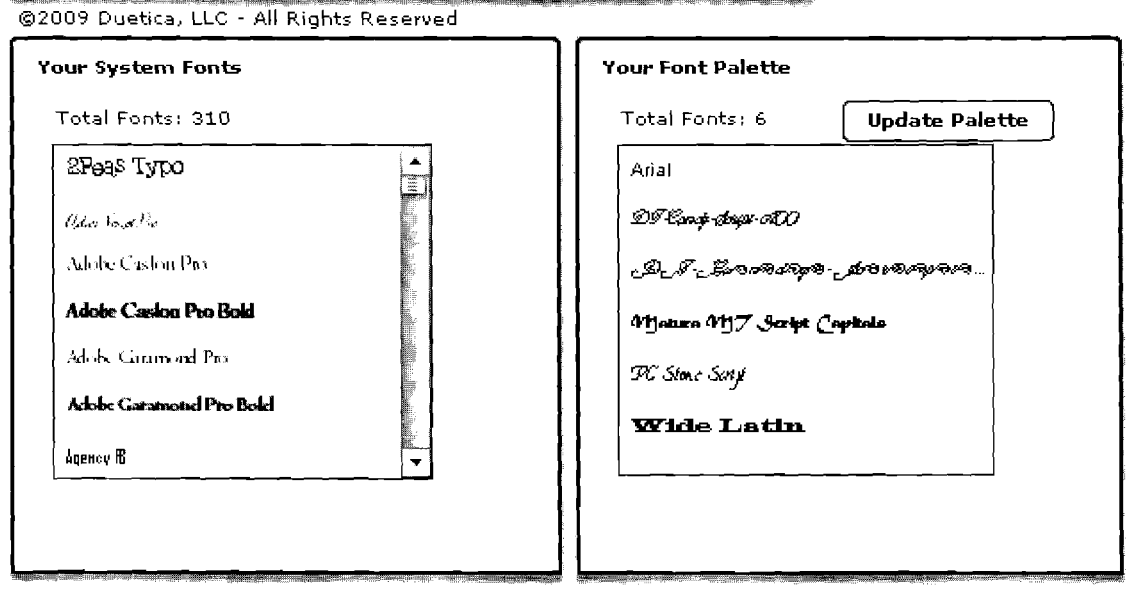

FONT SELECTOR AND METHOD FOR THE SAME

CROSS-REFERENCE TO RELATED APPLICATIONS

This application claims the benefit under 35 U.S.C. §119(e) of U.S. Provisional Patent Application No. 61/214,350 filed Apr. 22, 2009 with inventors Mark R. DiCamillo and Adrienne T. DiCamillo entitled FONT SELECTOR AND METHOD FOR THE SAME, the entirety of which is incorporated by reference herein as if set forth in the entirety.

FIELD OF THE INVENTION

The invention relates to electronic text and, more particularly, to a font selector and method for same.

BACKGROUND OF THE INVENTION

In typography, a font (also fount) is traditionally defined as a complete character set having a single size and in the style of a particular typeface. For example, the set of all characters for 9-point Bulmer italic is a font, and the 10-point size Bulmer italic would be a separate font, as would the 9 point upright. The term font is also often used as a metonym for typeface.

Since the introduction of computer fonts based on fully scalable, vector outlines, a broader definition of font has evolved. Font is no longer typically size-specific, but may still refer to a single style. For example, Bulmer regular, Bulmer italic, Bulmer bold and Bulmer bold italic are four fonts, but one typeface.

In addition to character height, there are several characteristics which may mechanically distinguish fonts, dependent upon the script(s) that a typeface supports. For example, in European alphabetic scripts, i.e. Roman, Cyrillic and Greek, the main such properties are the stroke width, called weight, the style or angle, and the per character width.

Most typefaces employ on the roman script, and hence a regular or standard font is often labeled as roman, such as to also distinguish it from bold or thin, and from italic or oblique. Further, different fonts of the same face may be used in the same work, such as for various degrees and types of emphasis.

For computing embodiments of typeface, font metrics refers to metadata consisting of numeric values relating to the size and space in a font overall, or in the individual glyphs of a font. A glyph is the artistic representation of a letter character. Font-wide metrics include cap height, x-height, ascender height, descender depth, and font bounding box, for example. Glyph-level metrics include the glyph bounding box, the advance width (total space for the glyph), and side bearings (space that pads the glyph outline on either side), for example.

Computer text editors take two forms, plain text and rich text. Plain text editors only render text in a single font style, typically called the system of console front. Rich text editors support multiple fonts and styles such as italic and bold. In typical embodiments of a standard rich text pad editor, if the user wants to select a different font for each character, the user first types the character, using the keyboard, then highlights the character, using the mouse or other pointing device, then continuing with the mouse, accesses the font selection menu, typically a drop-down combo-box, then navigates to a font by name, then tries to assess if the navigated font is truly the desired font (since the font menu only displays the name of the font rendered in the font, not all characters), then selects the font, and views the results. If the font glyph for that character is not appropriate, the user has to repeat this laborious process again and again until the desired look is achieved.

Hand lettered art and/or letters are artistic, aesthetically pleasing, and far more creative than typical computing fonts. To an extent, this pleasing nature of hand lettered art stems from the slight variability that occurs between each hand drawn letter. However, the use of the computer stifles this effect in that one character corresponds to one glyph, that is there is one appearance type for the font letters of that glyph. For example in an individual computer typeface font, each letter character 'a' is rendered exactly the same.

Thus, a need exists for a computer to have one character artistically and conveniently corresponded to multiple glyphs, so that computer output may mimic hand lettering and create the availability of multiple, pleasing appearance types.

SUMMARY OF THE INVENTION

The present invention provides a computer to have one character artistically and conveniently corresponded to multiple glyphs, so that computer output may mimic hand lettering and create the availability of multiple, pleasing appearance types.

In particular, a multi-glyph character selector is disclosed. The selector includes at least two glyphs associated with a character, wherein a microprocessor driven activation of the character selects a first of the at least two glyphs, and a subsequent activation of the character selects a second of the at least two glyphs, and a display driver, wherein the first glyph provides a first characterization of the character on a display in accordance with the display driver, and the second glyph provides a second characterization of the character on the display.

A system of selecting a glyph for a character is also disclosed. The system includes a graphical user interface responsive to at least one user input, and at least one mode of operation comprising at least two glyphs associated with each character, such that an activation of the character at the user input selects a first of the at least two glyphs, and a subsequent activation comprising a single action at the user input of the character selects a second of the at least two glyphs, the selection resulting in a display on the graphical user interface.

A template for selecting a glyph representing a character for connecting successive letters in a word is also disclosed. The template includes a character for inclusion in the word, a font for representing the character including at least one glyph associated with the a character, a leading connection level associated with the at least one glyph, the leading connection level representing the height scale of the leading connection of the at least one glyph, and an ending connection level associated with the at least one glyph, the ending connection level representing the height scale of the ending connection of the at least one glyph. The template further includes that the leading connection level is for connecting to the previous successive letter in the word and the ending connection level is for connecting to a subsequent successive letter in the word.

A system of selecting a glyph for a character is also disclosed. The system includes a graphical user interface, at least one mode of operation comprising at least two glyphs associated with the character, such that an activation of the character selects a first of the at least two glyphs, and a subsequent activation of the character selects a second of the at least two glyphs, the selection occurring for display on said graphical user interface, wherein the character is for inclusion in a word. The system further includes a font for representing the character, a leading connection level associated with one of the at least two glyphs, the leading connection level representing the height scale of the leading connection of one of the at least two glyphs, and an ending connection level associated with one of the at least two glyphs, the ending connection level representing the height scale of the ending connection of one of the at least two glyphs.

BRIEF DESCRIPTION OF THE FIGURES

Understanding of the present invention will be facilitated by consideration of the following detailed description of the preferred embodiments of the present invention taken in conjunction with the accompanying drawings, in which like numerals refer to like parts:

FIG. 1 is a display of a single glyph per character;

FIG. 2 is a display of multiple glyphs per character according to an aspect of the present invention;

FIG. 4 is a characterization of the mapping of a single character to numerous glyphs according to an aspect of the present invention;

FIG. 5 is a display of output text rendered from the use of multiple glyphs for each character according to an aspect of the present invention;

FIG. 7 is a display showing some of the attributes that lettering according to an aspect of the present invention may achieve;

FIG. 9 is a display of the user interface including a text editor, system fonts, and font palette according to an aspect of the present invention;

DETAILED DESCRIPTION OF THE PREFERRED EMBODIMENTS

Figure 3:
FIG. 3 is a characterization of the mapping of a single character to one glyph.

It is to be understood that the figures and descriptions of the present invention have been simplified to illustrate elements that are relevant for a clear understanding of the present invention, while eliminating, for the purpose of clarity, many other elements found in electronic text systems and methods. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

According to an aspect of the present invention, a computer may have one character correspond to multiple glyphs so that a computer output, either printed or displayed, may mimic hand lettering and thereby create the availability of multiple, aesthetically pleasing appearance types. As is known to those possessing an ordinary skill in the pertinent arts, a glyph is a graphical representation of a character. The present invention may be designed to operate in the Microsoft and Mac operating systems as well as through the Linux platform.

The present invention thus allows greater creativity in the use of computer fonts, such as to create more dynamic text styles that approximate aesthetically pleasing hand lettering, such as professional hand-lettered calligraphy. This may be accomplished through the adoption of "multi-glyph" font families or pallets. In such exemplary embodiments, rather than having only one true type font (ttf) file represent a font, there may be multiple ttf files that have variations of glyphs for each letter character. Other font file formats, such as open type, for example, may also be used according to an aspect of the present invention. This is advantageous in that it allows the font designer the latitude to design letters that intricately interact with other letters in the font, for example.

With a single glyph per character, typical text displays are static, such as the "Believe" shown in FIG. 1. By using multiple glyphs in accordance with the present invention, the text display can be, for example, the "Believe" shown in FIG. 2. The text of FIG. 2 may be created by using 4 different variations of the "PC Stone Script" ttf, (Pcstscp2.ttf, Pcstscp3.ttf, Pcstscp4.ttf, etc.), which, among other advantages, allows the font designer to have several different versions of the glyph for the "e" character. Such multiple versions may include, for example, one glyph with a long tail, one with a long cross-hash, and one with a star burst, by way of non-limiting example. Such a dynamic representation of text may be used in multiple embodiments, of markets including scrapbooking and professional graphic design, for example.

As an aspect of a graphical user interface (GUI) in accordance with the present invention, included may be a Word Pad-type editor, such as with additional functions added to provide a more interactive user interface for font/glyph selection and management of user-defined font pallets. According to an aspect of the GUI present invention, in-situ font selection may be provided. The GUI may enable a toggle between regular typing keyboard input, and in-situ font selection. As an aspect of the present invention, the GUI may highlight for the user which mode they are currently in, by way of non-limiting example, by changing the color of the text pad background display area, border or cursor, or via other visual or audio alert.

Standard keyboard input in the prior art may provide that, once a character key is pressed, the keyed character is rendered in the currently selected font, and the cursor is then advanced to the next character position. Depending on the insertion setting, this action in the prior art typically overwrites any current character at the cursor position, and/or inserts the new character at the cursor position correspondent to the keystroke.

In the present invention, a character key may be pressed, and the font selection advanced to the next font in the current "font pallet" including the rendering of the character in the new font, but the cursor position may not advance. Depression of a new character key may advance to the next font, a new character and/or may display a glyph for the key pressed. Such character placement may not be dependent on an insertion setting, and may be dependent on a font selection list, which font selection list may be generated at the direction of the user.

According to an aspect of the present invention, there may be a display of a dialogue box that shows the name of the current active font. This dialogue may update/refresh as the user cycles through the font list by pressing a character key, such as when the user is in a "multi-glyph" mode in accordance with the present invention. Such a multi-glyph mode may, in accordance with the present invention, allow a user to cycle through multiple character options, such as from a predetermined list which may be set by the user, on repeated strokes of the same key.

The present invention may allow for selection of the multi-glyph mode, such as by clicking on a multi-glyph button. To exit multi-glyph mode, a GUI button may be similarly activated. While in multi-glyph mode, you can also advance to the next character in your word by using the right arrow key.

According to the present invention, the multi-glyph, in-situ mode may allow the user to quickly cycle through the available glyphs for a character until finding the stylistic character that best fits with a desired design, for example a glyph that links with the character glyph immediately proceeding it. Once the desired glyph is selected, the user can return to standard keyboard input, or, for example, advance to the next character position still in multi-glyph mode, such as by hitting a different character key, an arrow key, or a "hot key" or combination of keys.

In certain exemplary embodiments, toggling between standard and multi-glyph, in-situ modes may occur via a special keyboard input so that the user does not have to use the mouse and/or move the cursor to select the font or mode although selection via the mouse may also be supported.

Referring now to FIG. 3, there is shown a characterization of the mapping of a single character to one glyph, as discussed herein throughout. Traditionally, computer fonts assign for each character, one glyph, or one appearance style, per font. This is depicted in FIG. 3, wherein the character "A" is shown on the left portion of the Figure, and the associated glyph for "A" on the right.

Figure 4:
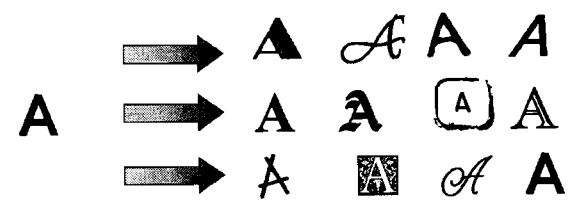

Referring now to FIG. 4, there is shown the mapping of a single character to numerous glyphs, as discussed herein throughout. The numerous glyphs for a single character may include subtle alterations in the appearance of the character, up to and including significant alterations in the appearance of the character. As may be seen in FIG. 4, the character "A" on the left portion maps to the associated glyphs for "A" to the right. As may be seen, the glyphs for the "A" represent "A"'s that are block type text, caligraphied text, tilted text, and artistic texts, by way of non-limiting examples only.

Referring now additionally to FIG. 5, there is shown output text rendered using multiple glyphs according to an aspect of the present invention. As may be seen in FIG. 5, the text "You inspire me to greater things" is displayed in computer type, but appears as if written by hand. The aesthetically pleasing variability found in handwritten text is evident. For example, there are three "T"'s depicted, and each of these "T"'s utilizes a different glyph. The use of multiple glyphs associated with the "T"s, by way of example, provides a handwritten feel to the textual representation.

Figure 6:
FIG. 6 is a display of output according to an aspect of the present invention.

Referring now to FIG. 6, there is shown output according to an aspect of the present invention. As may be seen in FIG. 6, the present invention may provide direct, in-situ, keystroke selection of fonts. Such direct, in-situ selection may provide the user with a real-time, visual feedback on how specific characters fit, and provide an illustration of the look and feel of the text as each letter is selected.

Referring now to FIG. 7, there are shown attributes of the lettering according to an aspect of the present invention. For example, interlocking letters, interconnecting letters, "handwritten" letters, flourishes and icons may be created using the present invention. As may be seen in FIG. 7, unique aspects depicted in the word and letters of IMAGINE may be provided. Interlocking letters, as depicted in FABULOUS, and interconnecting letters in LIL' COWPOKE, may be created. In addition, flourishes, such as those shown on the beginning and ending of WISHES, may be created. In particular, the flourish on the beginning W in "wishes," and the ending flourish on the last S in "wishes," may be created. Also, icons, such the illustrated OCEAN 33, may be created, for example. In the exemplary OCEAN 33°, the A is shown as created as a portion of the icon, and may be visually linked to the 33°.

Figure 8:
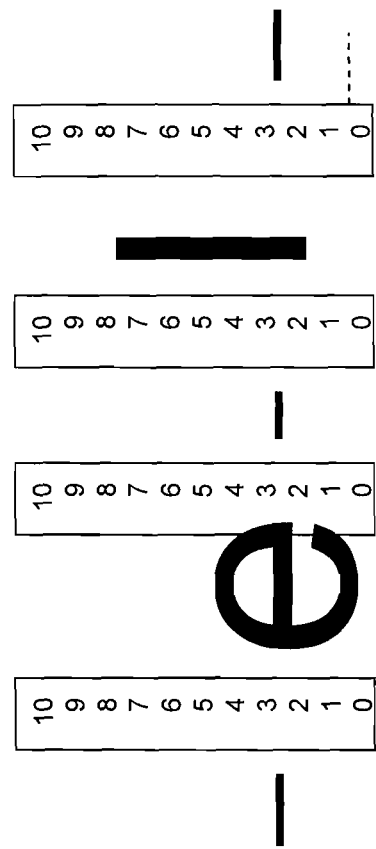
FIG. 8 is a template for selecting a glyph representing a character for connecting successive letters in a word according to an aspect of the present invention.

Referring now to FIG. 8, there is shown a template for selecting a glyph representing a character for connecting successive letters in a word according to an aspect of the present invention. As may be seen in FIG. 8, there may be provided, such as via the computing software and/or GUI of the present invention, a scale of, for example, 0-10 before and after each glyph. The scale before the glyph may be used to dictate where that glyph begins, and the scale after the glyph may be used to dictate where a glyph ends. The leading connection level may take a value of −1, 0, 1, 2, 3, 4, 5, 6, 7, 8, 9, 10, and 11. Similarly, the ending connection level may take a value of −1, 0, 1, 2, 3, 4, 5, 6, 7, 8, 9, 10, and 11. According to an aspect of the present invention, −1 or <null> may symbolize that the glyph has no connection preference. The default value for leading and ending connections may be −1; meaning no connection preference is specified. A value of 11 may symbolize the highest level of direct connection. Values 0 through 10 may represent relative connection points for each character, such as by height. According to an aspect of the present invention, 0 may represent a connection at the baseline for a font, for example. According to an aspect of the present invention, 0 may also be configured such that it is the depth of the longest descended glyph, for example.

Using this information, as well as the particular glyph, a functional usage for a glyph may be created. In such a situation, when a particular character is needed as the next letter in a word, and/or when connecting to a previous letter ending at a certain value on the scale, such as the height scale, the leading connector information in the glyphs representing that character may be used to provide a prioritized list of glyphs, wherein the priority may include a glyph having the most appropriate connective height, that may be used as the next successive letter.

Information, such as the aforementioned leading connection level and ending connection level, may be included in the font pallet meta data of the present invention. The font pallet definition may also include standardized meta-data that the font designer may use to create recommended character glyph pairings, for example. Each character font glyph may have associated therewith a myriad of the metadata and/or information, such as the leading and ending connection levels.

As may be seen in FIG. 8, both the E and L may have leading and ending connection values of 2. In such a configuration, the meta data may be represented as <font> creative1.tff </font>, <character> e (or the Unicode for this character)</character>, <leadingConnectionLevel>2</leadingConnectionLevel>, <endingConnectionLevel>2</endingConnectionLevel>, <font> creative2.ttf </font>, for example.

The leading and ending connection may be used, according to an aspect of the present invention, by weighting the glyphs according to best matching of the previous glyph end connection point with the depressed character glyphs leading connection point. For example, upon depression of a key, the present invention may check to determine what character immediately precedes the character pressed. The meta data for the depressed character may be accessed based on, for example, font, character, leading\Connection and ending\Connection. If the ending connection is greater than 0, the present invention may examine the meta data for the active font pallet and determine if any of the glyphs for the key pressed character have a leading\Connection value that equals the ending\Connection value of the preceding character. If there are such glyphs for the key press, these character glyphs (fonts) may be moved to the top of the font traversal list. Once all matching connection points have been found, the remaining font glyphs may continue in the pallet order. For example, if the pallet order is configured to be Font1, Font2, Font3, Font4, Font5, Font6, and Font7, but Font3 and Font7 have character glyphs with leading\ConnectionLevels that match the ending ConnectionLevel of the preceding character, the font sequence may be modified to Font3, Font7, Font1, Font2, Font4, Font5, and Font6.

While many cursive and brush-stroke fonts have interconnecting letters, many other fonts, such as block type fonts, do not. In an exemplary embodiment, the font designer may use the value 11 to signify a requested pairing. For example, the font designer might have an especially artistic pairing for the "th" letter combination. To identify this pair, the font designer may assign the "t" with an ending\Connection of 11, and a specific "h" character designed to go with the "t" character having the leading\Connection value of 11. According to an aspect of the present invention, when the "t" is typed and then the character for an "h" is depressed, this best match font for the "h" character may be promoted to the top of the font list.

According to an aspect of the present invention, there may be provided a tool for the creation of font pallet meta data. Such a tool may allow a font designer to create header information, such as with the font pallet name and a list of ttf files that make up the font pallet, as well as with the character/font scorings. For example, <character>, <font>, <leadingConnectionLevel>, <endingConnectionLevel>, may be provided as the header.

Referring now to FIG. 9, there is shown a display of an exemplary GUI, including a rich text editor, system fonts, and font palette, according to an aspect of the present invention. As may be seen in FIG. 9, the rich text editor may provide an area for text entry, a button to toggle multi-glyph mode on and off, buttons to save and print, and other functions found in a typical rich text editor. Further, system fonts that are typically resident may have been found on the computer housing the GUI may be displayed in a system font menu, along with a user font palette that may be created and separately displayed in a unique user font menu. FIG. 9 further shows an exemplary relationship between the rich text editor, the system fonts, and user fonts.

Figure 10:
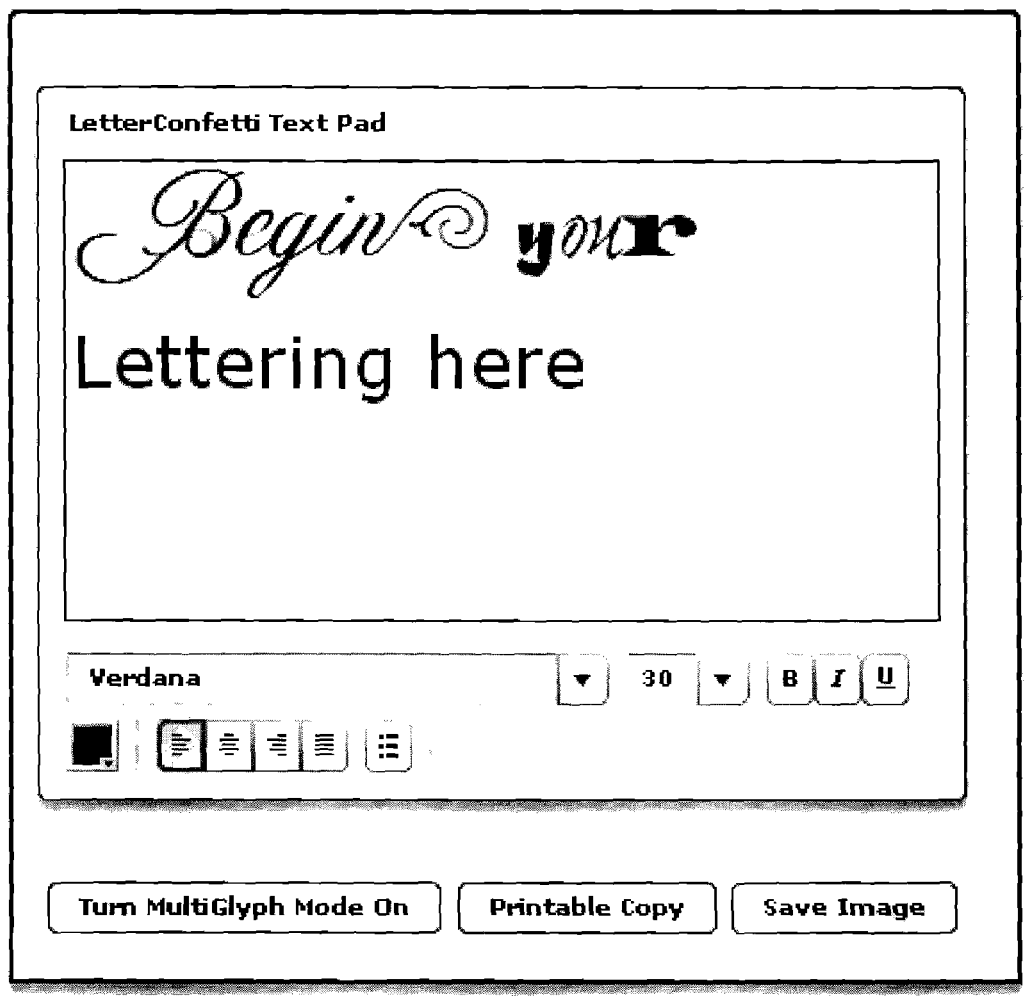
FIG. 10 is a display of a portion of the user interface highlighting the text editor.

Referring now additionally to FIG. 10, there is shown a display of the GUI highlighting the text editor in accordance with an exemplary embodiment. As may be seen in FIG. 10, the present invention may employ a standard rich text editor, which may include all basic functionality of rich text editors known to those possessing an ordinary skill in the pertinent arts, such as the functionality Word Pad or RTF rich text editor, for example.

The rich text editor of the present invention may provide numerous functionalities and toggles. These may be provided using drop down menus, or buttons or toggles, on the GUI. The rich text editor may also allow the user to create new, open, close, save and save as files, for example. Further, the rich text editor may allow the user to set up the page margins and orientation, for example. The rich text editor may also allow the user to print preview, select printer and print documents, for example. The rich text editor may also have the functions of cut, copy, paste content, including paste special, and may allow for clear and select all. The present text editor may also allow the user to find and find/replace, or undo actions. The rich text editor of the present invention may provide the ability to control the scale of the view and determine which tool bars to display. The rich text editor may also provide the ability to format documents and text. This may include, but not be limited to, providing the ability to select bold, italics, underline, font size, font color, to select justification of text, such as left, right and centered, to create bulleted lists, to input basic paragraph parameters such as spacing before and after paragraphs, line spacing, and indentation, and to set tab spacing.

The rich text editor of the present invention may provide the ability to input objects, such as bitmap graphics, by way of non-limiting example only. The rich text editor may provide horizontal and vertical rulers. The rich text editor of the present invention may incorporate a standard spell checker and may have the ability launch spell check. According to an aspect of the present invention, an in-line spell checker may be provided, such in-line spell checker checking the spelling as the user types. According to an aspect of the present invention, a grammar checker may also be provided, either using a launch function or an in-line grammar checker.

According to an aspect of the present invention, the text editor may be able to store user created work, such as by storing in HTML, RTF or MS Doc file formats, by way of non-limiting example only. The use of formats such as RTF and MS Doc file, and/or one or more of the countless others that perform similarly, is that these formats allow for the preservation of all font information. In addition, the font information may be preserved when transferred to and from a system clipboard. According to an aspect of the present invention, the text editor may be able to save the rendered type as a bit-map image, either transparent or opaque (in formats such as .png, .bmp, etc.) that can be imported into other design software and placed near or on top of other visual elements in the page design.

Figure 11:
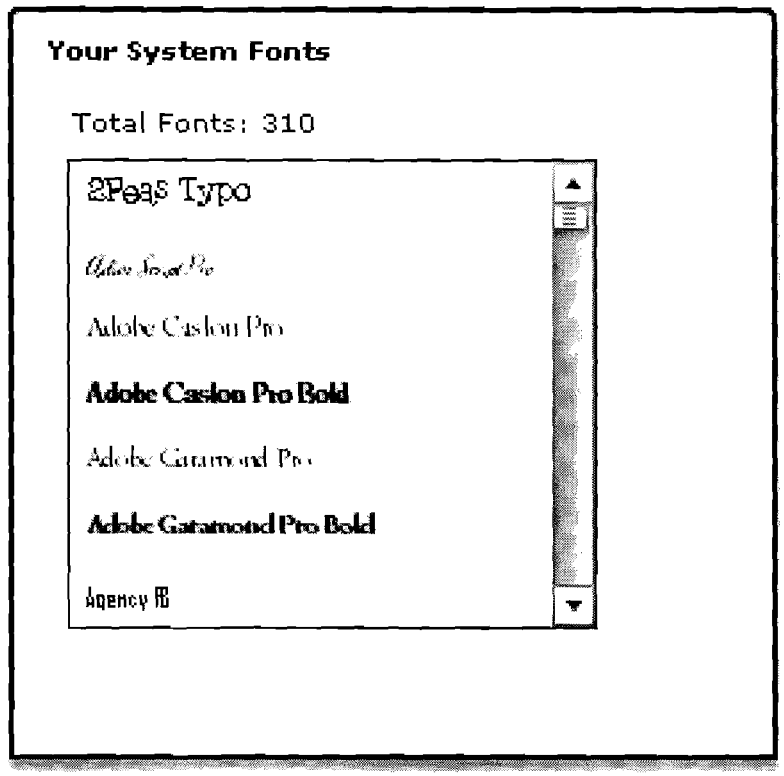
FIG. 11 is a display of a portion of the user interface highlighting the system fonts.

Referring now additionally to FIG. 11, there is shown a display of the GUI highlighting the system fonts. As may be seen in FIG. 11, a system font palette may be created that is an accumulation of all of the fonts that are located on the computing system associated with the GUI. As may be understood by those possessing an ordinary skill in the pertinent arts, the present application may cycle through a list of ttf font files, also called font pallets or palette. This pallet list may be a single font, or all fonts available, such as including fonts from the operating system. The pallet list may be a listing of individual ttfs, a list of pallet lists, or a combination thereof.

Since many graphics users have hundreds of fonts available, having to cycle through all fonts might diminish the benefit of the in-situ font selection. In order to diminish this drawback, and to aid the user in limiting fonts chosen for glyph selection, the present application may provide the opportunity to limit font lists to a currently active font pallet list, a user preferred list, or a preset number of fonts, such as 5, 10, 25 or 50, for example.

Additionally, according to an aspect of the present invention, new fonts may be created or added to the user's system. A user of the present system may be able to assemble, name and store, created font pallet lists. These lists may be lists of individual ttf files, lists of pallet lists or a combination of the two. Such new fonts may be designed with multiple ttf files to thereby take advantage of having multiple glyphs for each character in the font design. Font files may take the form of ttf files and a font pallet list, for example. The font pallet list may be in XML format, by way of non-limiting example only.

Naming of font files may take any form, but some recommended form of standardization to better associate the font pallet list with the ttf files may be used. The present invention may have also allow for locating of the font pallet lists, such as by having all lists stored in a specified system folder accessible to the user, such as via the GUI, for example.

The present invention may include the use of standardized font pallet definition. Such a standardized font pallet definition may take the form of an XML document template, by way of non-limiting example only. A standard definition may associate key attributes, such as the name of the font pallet, the tff, and the open type font files associated with the font pallet. The font pallet definitions may be protected, such that they cannot be deleted or renamed.

Figure 12:
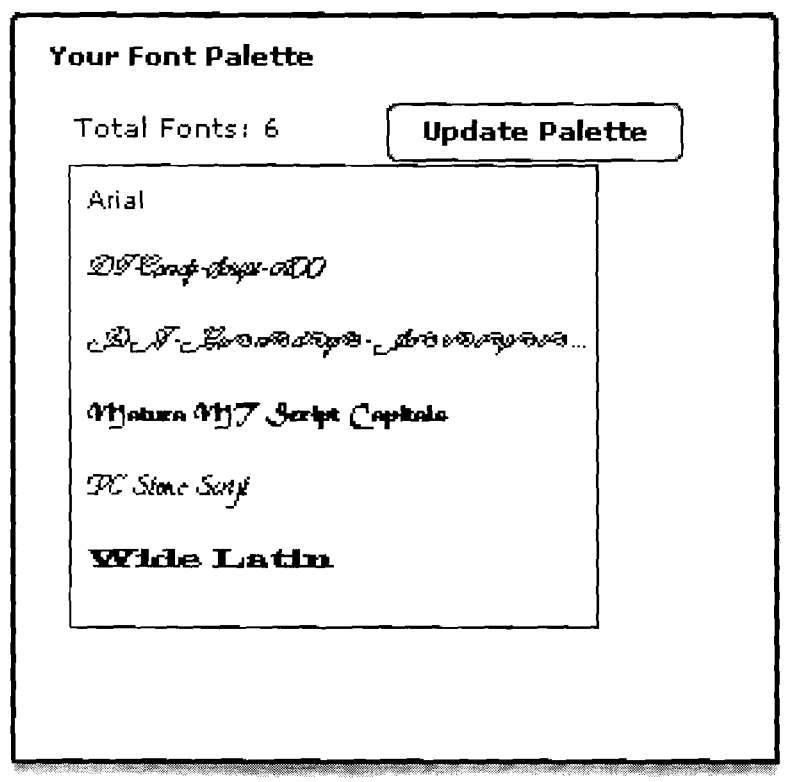
FIG. 12 is a display of a portion of the user interface highlighting the font palette; and, FIG. 13 shows a font pallet according to an aspect of the present invention.

Referring now additionally to FIG. 12, there is shown a display of the GUI highlighting the font palette. According to an aspect of the present invention, this palette may be the font that is used during the multiglyph mode. This selection may occur by using the leading and ending connection, according to an aspect of the present invention, such as by weighting the glyphs according to the best matching of the previous glyph end connection point with the depressed character glyphs leading connection point. For example, upon depression of a key, the present invention may first check to determine what character immediately precedes the character pressed. The meta data for the depressed character may be accessed, including such things as font, character, leading\Connection and ending\Connection, for example. If the ending connection is greater than 0, the present invention may examine the meta data for the active font pallet and determine if any of the glyphs for the key pressed character have a leading\Connection value that equals the ending\Connection value of the preceding character. If they do, these character glyphs (fonts) may be moved to the top of the font traversal list. Once all the matching connection points have been found, the remaining font glyphs may continue in the pallet order.

According to an aspect of the present invention, the display of FIGS. 9-12 illustrates a dialogue box that shows the name of the current active font. This dialogue box may update/refresh as the user cycles through the font list by pressing a character key.

Further, the present invention may also provide a randomizer which is activated using, for example, the top menu bar to toggle back and forth the randomizer function. When the randomizer is off/deselected, the rich text editor may traverse the list of available fonts in the pallet font list order, or the prioritized order based on the font meta data, as described hereinabove. When the randomizer is on/selected, the rich text editor may randomize the current font pallet list, and then traverse the list in the random order. The rich text editor may track the random order, thereby enabling the ability to traverse the list in reverse order using the alt+character keystroke, for example.

The present invention may also provide a help file that provides basic instructions for the key functions of the present invention. This help file may be indexed to allow easy searching for key help topics. This menu may also include information about the present application, including, but not limited to, the version number and any license key information. The help file may also include contact information, including such things as a website that a user may visit for additional help or to request more information.

Figure 13:
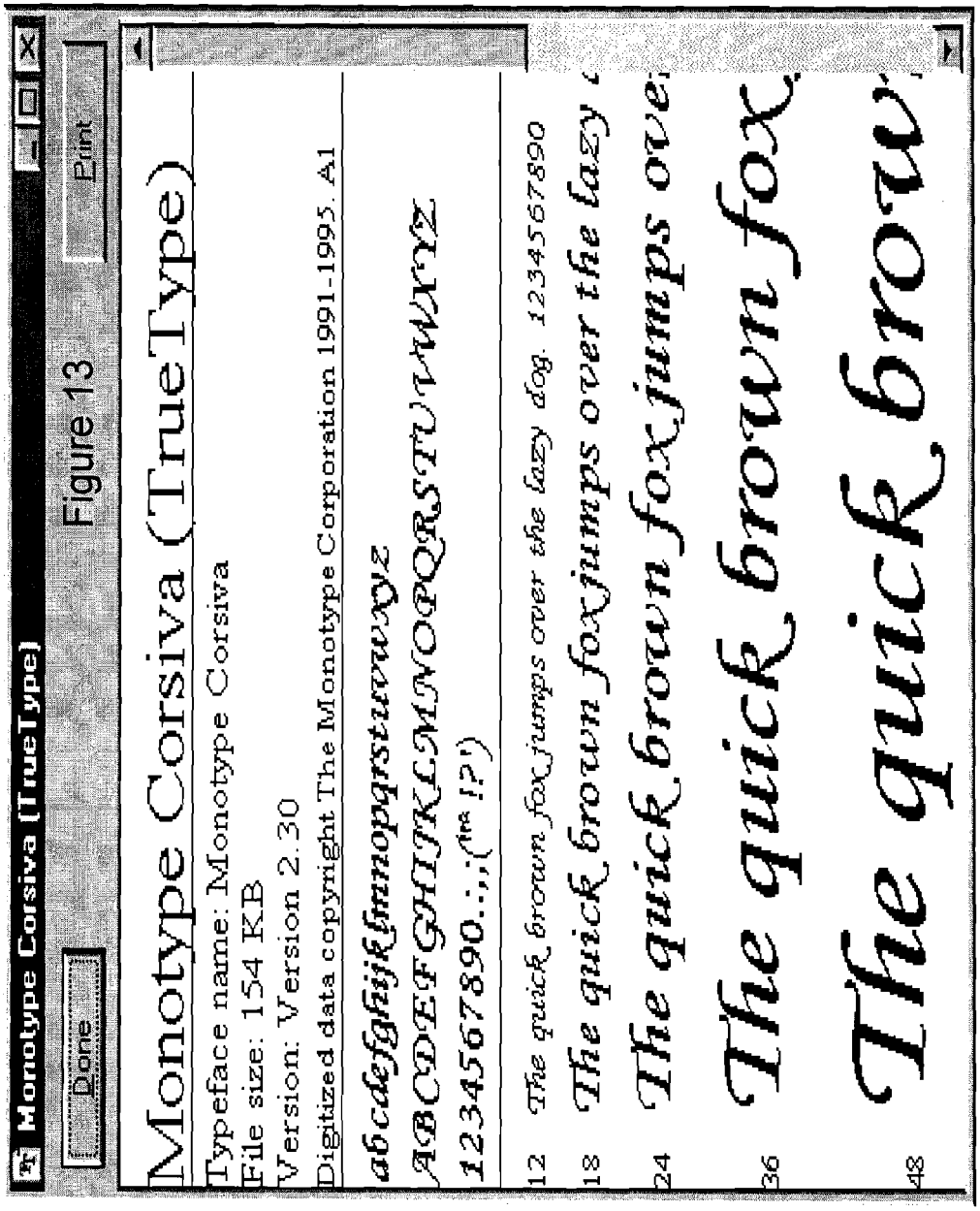

Referring now to FIG. 13, there is shown a font pallet according to an aspect of the present invention. As may be seen in FIG. 13, the font pallet identifies the typeface, file size, version and any copyright data. The pallet may also include characters represented in the font displayed, and/or several sentences displayed in varying sizes using the font displayed. As is known to those possessing an ordinary skill in the pertinent arts, the characters represented often take the form of the alphabet in lowercase and uppercase, along with numbers 0-9 and various punctuation. The sentences displayed in various sizes often come from the standard, "[t]he quick brown fox jumps over the lazy dog. 1234567890." According to an aspect of the present invention, an interface to an existing system font tool such as a font property popup dialog as shown in FIG. 13 may be included.

The present invention may also provide for the management of font pallets. Such font management may take the form of a menu driven management system. Such a menu system may provide a list of all the available font pallets that are located by and/or known to the present application. Such a list may include the names of the font pallets, the number of ttf files in the pallet, and the dates the ttf files were created, for example. The menu may take the form of a hierarchy of font pallets in user-defined groups, by way of non-limiting example only.

According to an aspect of the present invention, groups of font pallets may be created and named. The menu display of the font pallets may be displayed by group, such as to provide for ease of use. According to an aspect of the present invention, user input may be needed to name the groups, or names may be assigned. Populating groups may be performed by dragging and dropping font pallets into the various groups, or another known file control technique, for example.

The present application may allow a user to see a detailed view of a selected font pallet. Such a view may include the font pallet name, the date the font pallet was last modified, and a listing of the font ttf files that make up the pallet. Further, according to an aspect of the present invention, the system of the present invention may permit a user to see a detailed view of any ttf or open type font, displaying the font name, font type, version number, copyright information, and a display of all the characters in that font style, as may be seen in FIG. 13, for example. This display may be achieved by calling the native font display in Windows or Mac, for example. Further, the present application may allow for the deletion of non-protected font pallets, for the re-naming of non-protected font pallets, and enable a user to select a font pallet and copy it, and give the copy a new name, for example.

The standardized font pallet definition of the present invention may support the concept of protection. Many different types of protection schemes may be used, including schemes such as, no protection, complete protection and degrees of protection. According to an aspect of the present invention, protected font pallets may be configured to prevent being deleted or renamed, while still allowing for copying. Such a configuration may allow font designers to create font pallets that group together created ttf files to build unique fonts.

The present invention may allow the user to create new font pallets. In so doing, the present invention may include a dialogue/wizard that may walk the user through the creation of a font pallet. Such a dialogue/wizard may be configured similar to a mail-list creation dialogue wherein the user has fields to name a font pallet, add and delete other font pallets and ttf font files, and save the created font pallet. The same basic dialogue that is used for creating font pallets may also be used for editing existing, non-protected font pallets. The user may be able to add and delete font pallets and font files to/from the font pallet list.

According to an aspect of the present invention, the present application may only have one font pallet active per keyboard input at a time. Such a system may increase the ease of use, particularly for novice users of the systems. The process of having only a single active font pallet may be overridden, and any number of font pallets may be selected to be active. Selection of the number of active font pallets may enable more advanced users of the present invention to select multiple font pallets to be active at a given time, such as based on preferences. Thus, the present application may provide the ability to select and deselect font pallets, and identify font pallets active for typing.

Those of ordinary skill in the art may recognize that many modifications and variations of the present invention may be implemented without departing from the spirit or scope of the invention. Thus, it is intended that the present invention covers the modifications and variations of this invention provided they come within the scope of the appended claims and their equivalents.

We claim:

1. A system of selecting a glyph for a character in a word or text string, said system comprising:
    a graphical user interface;
    at least one mode of operation comprising at least two glyphs associated with the character, such that an activation of the character selects a first of said at least two glyphs, and a subsequent activation of the character selects a second of said at least two glyphs, said selection occurring for display, replacing the said display's rendering of the said first glyph, on said graphical user interface;
    wherein the character is for inclusion in a word;
    a font for representing the character;
    a leading connection level associated with one of the at least two glyphs, said leading connection level representing the height scale, measured from the lettering line or other graphical metric, of the leading connection of one of the at least two glyphs; and
    an ending connection level associated with one of the at least two glyphs, said ending connection level representing the height scale, measured from the lettering line or other graphical metric, of the ending connection of one of the at least two glyphs with the selection priority based on the closeness of the match between the succeeding character glyph's leading connection level to the proceeding character glyph's ending connection level.

2. The system of claim 1, wherein said leading connection level ranges from zero to 10 to represent relative connection levels by height.

3. The system of claim 1, wherein said leading connection level is represented as negative one when no connection preference is specified.

4. The system of claim 1, wherein said leading connection level is represented by eleven to symbolize a high level of direct connection.

5. The system of claim 1, wherein said ending connection level ranges from zero to 10 to represent relative connection levels by height.

6. The system of claim 1, wherein said ending connection level is represented as negative one when no connection preference is specified.

7. The system of claim 1, wherein said ending connection level is represented by eleven to symbolize a high level of direct connection.

8. The system of claim 1, wherein said leading connection level is represented by a unique number to symbolize a high level of direct connection.

9. The system of claim 1, wherein said ending connection level is represented by a unique number to symbolize a high level of direct connection.

10. The system of claim 1, wherein said leading connection level is represented by a unique number to symbolize a high level of direct connection with a second glyph having a matching unique number for the ending connection of the second glyph.

11. The system of claim 1, wherein said ending connection level is represented by a unique number to symbolize a high level of direct connection with a second glyph having a matching unique number for the leading connection of the second glyph.

* * * * *